United States Patent [19]
Inazuka et al.

[11] 3,755,158
[45] Aug. 28, 1973

[54] PROCESS FOR CAPTURING METAL IONS

[75] Inventors: Shinichi Inazuka, Tokyo; Masahiro Takehara; Ryonosuke Yoshida, both of Kanagawa, all of Japan

[73] Assignee: Ajinomoto Co., Inc., Tokyo, Japan

[22] Filed: Aug. 4, 1971

[21] Appl. No.: 169,034

[30] Foreign Application Priority Data
Aug. 10, 1970 Japan.............................. 45/69916

[52] U.S. Cl...................... 210/50, 210/53, 210/54, 75/108, 423/11
[51] Int. Cl................................................ C02b 1/26
[58] Field of Search............ 75/108; 210/42, 50–54, 210/59; 252/180

[56] References Cited
UNITED STATES PATENTS

| | | | |
|---|---|---|---|
| 3,041,374 | 6/1962 | Gregory............................ | 75/108 X |
| 3,337,555 | 8/1967 | Billman et al..................... | 75/108 X |
| 3,412,180 | 11/1968 | Corley............................. | 210/59 X |
| 3,433,738 | 3/1969 | Black et al........................ | 210/54 |
| 3,437,451 | 4/1969 | Every et al....................... | 210/54 X |
| 3,467,684 | 9/1969 | Lane................................. | 75/108 X |
| 3,491,086 | 1/1970 | Harvey............................. | 210/53 X |
| 3,518,171 | 6/1970 | Merker et al..................... | 210/59 X |
| 3,634,230 | 1/1972 | Odom et al...................... | 210/52 |

*Primary Examiner*—Samih N. Zaharna
*Assistant Examiner*—Thomas G. Wyse
*Attorney*—Hans Berman

[57] ABSTRACT

Cations of metals other than the alkali metals may be precipitated practically completely from their aqueous solutions at a pH of 4 or higher by N-acylamino acids whose acyl group is alkanoyl or alkenoyl having seven to 25 carbon atoms, the acylamino group being connected with the carboxyl group by divalent alkylene having one to five carbon atoms. The voluminous precipitates include even more of the metal ions originally present and settle faster in the presence of small amounts of polyhydric alcohols, polyethers, alkali metal silicates, or alkali metal borates. Water polluted with heavy metals can be made potable by this method.

12 Claims, 1 Drawing Figure

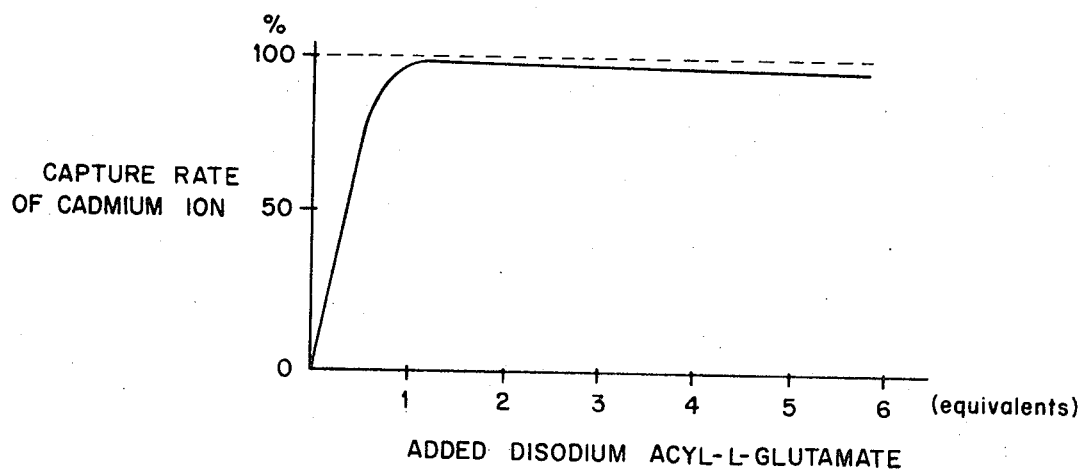

PROCESS FOR CAPTURING METAL IONS

The present invention relates to a novel process for capturing metal ions, and more particularly it relates to a process for capturing metal cations which comprises adding as a capturing agent N-higher aliphatic acyl amino acid or a water soluble salt thereof to an aqueous solution containing metal cations.

For capturing metal ions, particularly heavy metal ions contained at low concentration in water, there has been proposed a precipitation process in which metal ions are separated in the form of the insoluble inorganic metal salt. This process, however, is only applicable to specific metal ions which form the hardly soluble salt with a precipitant. Also, the formed inorganic metal salt exists in very fine particles or in a colloidal state, which makes the filtration very difficult. Particularly in the mixture of different metal ions, the formation of the respective insoluble precipitates and their removal steps are complicated. Moreover, a large amount of precipitant remains still in the liquid phase from which the precipitate has been removed and so many difficult points are encountered from the point of view of drainage treatment. From these reasons, this process is not satisfactory economically and practically.

An another process proposed hitherto is a ion flotation in which a water soluble surfactant as a collector is added to an aqueous solution containing metal ions and then air is bubbled thereinto to form a froth, thereby hardly soluble materials rise to the surface in the froth and are thus removed. However the collectors employed hitherto have their limited collectivity so that metal ions can not be collected up to the infinitesimal amount. And this process is not economically feasible.

Recently, the pollution of rivers by harmful metals which are remained in very small amount in industry drainage becomes a serious problem. This is mainly environment pollution based on heavy metals such as cadmium, lead, mercury, and the like, and a countermeasure for it is desired eagerly.

An object of the present invention is to provide a commercially easily feasible process for capturing metal ions by which the above harmful heavy metal ions and other various metal ions can be removed and recovered substantially completely from their aqueous solution.

It has now been found that when N-higher aliphatic acyl amino acid or a water soluble salt thereof is added to an aqueous solution containing metal ions, a hardly soluble metal salt of large size precipitates promptly and the salt may be simply and substantially completely separated from the solution by the application of a conventional procedure.

The present invention also provides a satisfacotry process for capturing metal ions which has the following outstanding features:

Firstly, this process is applicable to all cationizing metals with exception of alkali metals (the periodic table group I, subgroup A of elements). The processes known hitherto, i.e. the precipitation process by the formation of inorganic metal salts and the ion flotation are only applicable to a part of metals and is complicated in the capturing step.

Secondly, the hardly soluble metal salt aggregates in large particles and precipitates or crystallizes out, and therefore the aftertreatments such as a filtration are easy.

Thirdly, the metal ions can be captured substantially completely, whatever the concentration of the metal ions is in the liquid. For example, when disodium N-hydrogenated tallow oil fatty acid acyl glutamate is applied to cadmium ions as a capturing agent, a concentration of cadmium ions ranging from 20,000 ppm to 5 ppm in the original solution may be reduced to under 0.01 ppm at one stroke. This concentration corresponds to the allowed concentration of cadmium ions in drinking water as provided for by WHO international standard.

Fourthly, the amount of N-higher aliphatic acyl amino acid or its water soluble salt necessary to capture metal ions may be equivalent or slightly excess amount with respect to the metal ion content. the addition of this amount of N-higher aliphatic acyl amino acid (or its water soluble salt) gives the best capturing effect. It is not necessary to add excess amounts of the capturing agent. In some case, the addition of too much of the capturing agent rather brings about the dissolution of the insoluble salts precipitated and decreases the capturing effect. Because the addition of excess capturing agent is not necessary, almost no N-higher aliphatic acyl amino acid or its water soluble salt remains in the mother liquor and hence there is almost no load of the biochemical oxygen demand (BOD) and the chemical oxygen demand (COD). Alos, since this capturing agent of the present process is apt to be disintegrated by the action of microorganisms, the treatment is easy even when the agent is added in such excess amount that the load of BOD and COD exceeds the permissible amount. In case of the known capturing agents, for example hydrogen sulfide, it is necessary to add an excess amount of hydrogen sufide over the metal ions to be captured and hence a large amount of hydrogen sulfide remains in the aqueous solution from which metal ions have been captured, and the treatment of drainage becomes difficult.

Fifthly, from the metal salt separated, the metal may be readily recovered as its water soluble salt or its oxide, and N-higher aliphatic acyl amino acid may also be readily recovered and reused.

These features cannot be found in other similar surfactants such as sodium alkylbenzenesulfonate, sodium lauryl sulfate and fatty acid soap. As to sodium dodecyl benzene sulfonate and sodium lauryl sulfate, they show little or no capturing action toward metal ions, as apparant from Table 2 shown hereafter. Also, fatty acid soap is not suitable as the capturing agent because of its poor capturing power.

It has been further found that certain compounds are effective as capturing assistants or flocculent assistants for the capturing agent of N-higher aliphatic acyl amino acid or its water soluble salt. That is to say, the capturing effect of metal ions by N-higher aliphatic acyl amino acid or its water soluble salt is remarkably increased by employing as capturing assistant one or more members selected from the group consisting of organic compounds having two or more alcoholic hydroxyl groups in the molecule, organic compounds having more than two ether linkages in the molecule, alkali metal silicate and alkali metal borate. When a very small amount of at least one of the above four kinds of capturing assistants is added to an aqueous solution containing metal ions together with N-higher aliphatic acyl amino acid or its water soluble salt, the N-higher aliphatic acyl amino acid (or its water soluble salt) shows further remarkable capturing action and the hardly soluble metal salt formed precipitates out more promptly. Owing to such advantage, the metal ions contained in industry drainage may be completely removed by application of the most easy natural sedimentation process. Also, by using these capturing assistants, the reaction of N-higher aliphatic acyl amino acid (or its water soluble salt) and metal ions may be smoothly conducted. More concretely speaking, to an aqueous solution containing one or more of metal ions belonging to the periodic table of the elements group I, subgroup B to group VIII, are added N-higher aliphatic acyl amino acid (or its water soluble salt) in an amount of about 0.01 – 10, preferably 1.0 – 4.0 stoichiometric equivalents of the metal ions contained therein and one or more of the four kinds of capturing assistants in about $10^{-7} - 10$ percent by weight, preferably $10^{-5} - 10^{-1}$ percent by weight of the N-higher aliphatic acyl amino acid (or its water soluble salt) added, whereby the increased capturing effect is obtained as well as higher sedimentation velocity of the formed precipitate as compared when N-higher aliphatic acyl amino acid (or its water soluble salt) alone is added. And metal ions may be further efficiently separated by using the conventional sedimentation equipments such as precipitation pool and thickener. Owing to attainment of the increased capturing effect, metal ions may also be separated by using an ion flotation equipment.

N-higher aliphatic acyl amino acid or its water soluble salt which may be the capturing agent in the present process is an amino acid derivative having acyl group being introduced into amino group of various amino acids. The higher aliphatic acyl radical may be alkanoyl or alkenoyl derived from saturated or unsaturated fatty acid having eight to 26 carbon atoms, preferably 12 to 22 carbon stoms, for example, acyl radical of fatty acid consisting of single component (such as lauric acid, palmitic acid, stearic acid or oleic acid), the acyl radicals of the naturally originating mixed fatty acids (such as coconut oil fatty acid, tallow oil fatty acid, hydrogenated tallow oil fatty acid) or the acyl radical of a synthetic fatty acid (inclusive of branched chain fatty acid too).

The amino acid components are acidic amino acids such as glutamic acid, aspartic acid, α-aminoadipic acid, α-aminopimeric acid, cysteic acid, homocysteic acid and 2-aminoeicosane dicarboxylic acid; diaminodicarboxylic acids such as α, α'-diaminocitric acid, α, α'-diaminoglutaric acid and α,α'-diaminoadipic acid; neutral amino acids such as glycine, alanine, α-aminobutyric acid, valine, norvaline, leucine, isoleucine, norleucine, phenylalanine, tryptophane and proline; basic amino acids such as lysine, ornithine, arginine, histidine and isolysine; sulfur-containing amino acids such as methionine, cystein, cystine, homocystine, penicillamine, β-thiolleucine and ethionine; hydroxyamino acids such as threonine, serine, tyrosine, β-hydroxyleucine, homoserine and oxyproline; N-methyl or N-ethyl derivatives of these β-amino acids; ω-lower alkyl ester of acidic amino acids such as glutamic and aspartic acids; O-acyl or O-methyl derivatives of hydroxyamino acids; N', N'-di-lower alkyl or N'-acyl derivatives of basic amino acids such as lysine and ornithine. In addition to these α-amino acids, β-amino acids such as β-alanine and β-aminoisobutyric acid; ω-amino acids such as γ-aminovalerianic acid and ω-aminocaproic acid, wherein the acylamino group is connected with the carboxyl group by a divalent alkylene group of five carbon atoms; and N-methyl, N-ethyl derivatives of these amino acids may be also employed. These amino acids or their derivatives may be optically active forms or racemic.

As the water soluble salts of N-higher aliphatic acyl amino acids, there may be employed alkali metal salts such as lithium, sodium and potassium salts, the ammonium salt, and salts with organic bases such as methylamine, triethylamine, diethylamine and ethanolamine.

Among these N-higher aliphatic acyl amino acids and their water soluble salts, especially N-higher aliphatic acyl derivatives of acidic amino acids such as glutamic and aspartic acids and their water soluble salts have two carboxylic groups and hence when they are employed as the capturing agent the capturing effect is obtained by the addition of a smaller amount of them and the formed precipitates are large particles having a good filterability. Also, the respective N-higher aliphatic acyl derivatives of phenylalanine, cystein, cystine and tryptophane are the preferred capturing agents. However, N-methyl-N-higher aliphatic acyl amino acid salts have somewhat weak capturing abilities.

Among the capturing assistants or the flocculant assistants which may be employed together with N-higher aliphatic acyl amino acids or their water soluble salts in the present invention are following: That is to say, examples of organic compounds having two or more alcoholic hydroxyl groups in the molecule include lower polyhydric alcohols such as ethylene glycol, propylene glycol, glycerin and sorbitol; monosaccharides such as glucose, galactose, dextrin, xylose; polysaccharides such as maltose, lactose, starch (inclusive of oxidized starch, enzyme-treated starch) and cellulose powder; hydroxyalkoxylated saccharides which may be prepared by reacting ethylene oxide and these saccharides; cyanoethylated starch; carboxyethylated starch; high molecular compounds such as polyvinyl alcohol, polypropylene alcohol. Examples of compounds having more than two ether linkages in the molecules include polyalkylene glycols such as polyethylene glycol, polypropylene glycol, nonionic surfactant containing polyoxyethylene group. Examples of alkali metal silicates include lithium silicate, sodium silicate and potassium silicate. And, examples of alkali metal borate include lithium borate, sodium borate and potassium borate. As to these silicates and borates, those of various composition may be employed.

These capturing assistants may be soluble in water or capable of emulsifying and dispersing uniformly in water. Among these compounds, especially polyethylene glycol having moelcular weight of 400 – 6,000, polyvinyl alcohol having molecular weight of 400 – 2,000, sodium metasilicate or sodium metaborate, when added singly or as admixture to an aqueous solution containing metal ions, promotes the aggregation and sedimentation velocity remarkably.

As to the order of the addition of the capturing assistant, it is desirable that N-higher aliphatic acyl amino acid (or its water soluble salt) is first added to an aqueous solution containing metal ions, thereby a hardly soluble metal salt is formed, and thereafter the capturing assistant is added thereto. Of course, the capturing assistant may be added in advance to an aqueous solution containing metal ions and then N-higher aliphatic acyl amino acid (or its water soluble salt) may be added. Otherwise both may be added simultaneously. Also, when the higher molecular compounds are employed as the capturing assistant, the higher the molecular weight is, the greater is the effect for promoting aggregation and sedimentation.

The amount of the capturing assistant to be added may be about $10^{-7} - 10$ percent by weight of the amount added of N-higher aliphatic acyl amino acid (or its water soluble salt) for attainment of the desired sufficient effect. On the other hand, when the capturing assistant is added in exceedingly large amount, an appreciable capturing effect is not obtained and solubilization of the hardly soluble metal salt formed offen occurs. Also, a mixture of different capturing assistants gives a better result as compared to that of a single capturing assistant.

The metal ions which may be captured according to the present process are the periodic table group I, subgroup B of elements such as copper and silver; group II of elements such as magnesium, calcium, strontium, barium, radium, zinc, cadmium and mercury; group III of elements such as aluminium, gallium, indium, thallium, scandium, yttrium, rare earth elements such as lanthanum and actinide elements (e.g. uranium, actinium); group IV of elements such as germanium, tin, lead, hafnium, zirconium, and titanium; group V of elements such as antimony, bismuth, arsenic, vanadium, niobium and tantalum; group VI of elements such as chromium, molybdenum, tungsten, selenium, tellurium and polonium; group VII of elements such as manganese and technetium, and group VIII of elements such as iron, cobalt, nickel, palladium and platinum. Also, metal ion may be organic metal or complex cation.

In accordance with one embodiment of the present process, an N-higher aliphatic acyl amino acid or its water soluble salt is added directly or as a solution in water, suitable water-miscible organic solvent such as methanol or ethanol or their mixtures to an aqueous solution containing the metal ions as mentioned above, the amount added is about 0.01 to 10 equivalents, preferably 1.0 to 2.0 equivalents per equivalent of metal ions. If desired, the capturing assistant as specified already may be further added thereto in about $10^{-7}$ to 10 percent by weight of N-higher aliphatic acyl amino acid (or its water soluble salt), and thereby an insoluble or hardly soluble metal salt having a good filterability aggregates and precipitates immediately. The precipitates may be easily separated by the conventional solid-liquid separation procedures such as filtration and decantation. It is desirable to add N-higher aliphatic amino acid (or its water soluble salt) to a solution containing metal ions at pH above 4. In case that an aqueous solution containing metal ions is above pH 8, N-higher aliphatic acyl amino acid, preferably N-higher aliphatic acyl acidic amino acid is added and thereby metal ions may be effectively captured and the solution may be made neutral. Also, the temperature of treatment may be optionally selected but the room temperature is preferable. According to the present invention, the aggregation and sedimentation of the hardly soluble metal salt formed is completed in a short time. After treatment the residual metal ion concentrations in the mother solution or in the supernatant solution were measured by using an atomic adsorption photometer or a colorimeter and it becomes evident that almost no metal ions was detected and that the salts were filtered off or aggregated and precipitated substantially completely.

The precipitates separated are decomposed, for example, by treating with mineral acid and the metal ions may be recovered as the water soluble salt. Also, the precipitates may be burned to recover the metals as metal oxides.

The present invention is further illustrated by the following examples.

EXAMPLE 1

Nine aqueous solutions of cadmium sulfate containing $5 - 10,000$ ppm as cadmium ion were prepared, and 1.2 equivalent of disodium N-hydrogenated tallow oil fatty acid acyl-L-glutamate was added as a 2.0 percent aqueous solution to the respective solutions. The stirring was continued at room temperature and thereby a large amount of insoluble cadmium salt crystallized out. The crystals were filtered out with a filter paper ("Toyo filter paper No.5A"). The residual cadmium ion concentrations in the mother solution were measured by using an atomic adsorption photometer. The results were shown in Table 1.

TABLE 1

| The $Cd^{++}$ conc. in the original solution | The $Cd^{++}$ conc. in the mother solution | The pH of the solution treated |
|---|---|---|
| 10,000 ppm | 0.100 ppm | 6.40 |
| 5,000 | 0.020 | 6.30 |
| 1,000 | 0.050 | 6.45 |
| 500 | 0.009 | 6.72 |
| 100 | 0.012 | 6.43 |
| 50 | 0.009 | 6.35 |
| 20 | 0.007 | 6.25 |
| 10 | 0.005 | 6.20 |
| 5 | 0.008 | 6.40 |

EXAMPLE 2

With respect to twelve metal ions as shown in Table 2, aqueous solutions of 100 ppm concentration and aqueous solutions of 20 ppm concentration were prepared respectively. 1.2 Equivalent of the individual N-higher aliphatic acyl amino acid salt shown in Table 2 was added to each solution as the 2.0 percent aqueous solution, and the mixture was treated in a similar manner as in Example 1. The results obtained were shown in Table 2. For the purpose of a comparison, the results obtained when the similar test was conducted with sodium dodecyl benzenesulfonate, sodium laurylsulfate, and fatty acid soap are also shown in the same table.

As is apparent from Table 2, N-higher aliphatic acyl amino acid salts have remarkable capturing activities to metal ions.

EXAMPLE 3

2.0 percent aqueous solutions of various N-higher aliphatic acyl amino acid salts as shown in Table 3 were prepared and the solutions were respectively added dropwise to aqueous solutions containing 100 ppm of $Hg^{2+}$, $Al^{3+}$, $Sn^{4+}$, $Pb^{4+}$, $Co^{3+}$, $Ni^{3+}$ and $U^{3+}$ under the same conditions as in Examples 1 and 2. The resultant slurry in every case was filtered out by the following two different methods.

i. treated with activated charcoal and then filtered out using a filter paper ("Toyo filter paper No.5A").

ii. filtered out with a sand filter compacted with sands of various sizes and shapes.

The residual metal ion concentration in the respective filtrates was measured by using an atomic adsorption photometer. The results are shown in Table 3.

TABLE 2

| Capturing agents | Cd²⁺ | | | Hg²⁺ | | | Al³⁺ | | | Sr²⁺ | | | Sn⁴⁺ | | | Pb²⁺ | | | Fe³⁺ | | | Co³⁺ | | | Ni³⁺ | | | U³⁺ | | | Cu²⁺ | | | Cr²⁺ | |
|---|---|---|---|---|---|---|---|---|---|---|---|---|---|---|---|---|---|---|---|---|---|---|---|---|---|---|---|---|---|---|---|---|---|---|---|
| | 100 | 20 | | 100 | 20 | | 100 | 20 | | 100 | 20 | | 100 | 20 | | 100 | 20 | | 100 | 20 | | 100 | 20 | | 100 | 20 | | 100 | 20 | | 100 | 20 | | 100 | 20 |
| | Initial conc. (p.p.m.) | | | | | | | | | | | | | | | | | | | | | | | | | | | | | | | | | | |
| The present invention: | | | | | | | | | | | | | | | | | | | | | | | | | | | | | | | | | | | |
| Sodium N-hydrogenated tallow oil fatty acid acyl-L-glutamate | 0.012 | 0.007 | | 0.01 | 0.01 | | 0.39 | 0.20 | | 0.70 | 0.65 | | 0.75 | 0.08 | | 0.77 | 0.10 | | 3.50 | 0.40 | | 0.20 | 0.15 | | 1.32 | 0.07 | | 1.30 | 0.11 | | 0.42 | 0.010 | | 0.01 | 0.009 |
| Disodium N-oleoyl-L-glutamate | 0.051 | 0.012 | | 0.04 | 0.02 | | 0.85 | 0.45 | | 2.40 | 0.70 | | 0.53 | 0.40 | | 0.75 | 0.54 | | 4.50 | 0.61 | | 0.40 | 0.25 | | 0.87 | 0.15 | | 1.03 | 0.09 | | 0.30 | 0.030 | | 0.20 | 0.10 |
| Sodium N-lauroyl-L-phenylalanate | 0.005 | 0.005 | | 0.01 | 0.01 | | 0.50 | 0.35 | | 0.85 | 0.73 | | 0.31 | 0.10 | | 1.84 | 0.15 | | 3.00 | 0.85 | | 0.30 | 0.25 | | 0.75 | 0.12 | | 0.82 | 0.05 | | 0.25 | 0.025 | | 0.30 | 0.10 |
| Potassium N-lauroyl-DL-methionate | 0.021 | 0.007 | | 0.03 | 0.05 | | 0.70 | 0.23 | | 1.20 | 0.54 | | 0.80 | 0.70 | | 1.50 | 0.43 | | 4.05 | 0.85 | | 1.05 | 0.30 | | 0.85 | 0.26 | | 0.53 | 0.08 | | 0.26 | 0.030 | | 0.42 | 0.3 |
| Sodium N-lauroyl-L-valinate | 0.010 | 0.008 | | 0.03 | 0.02 | | 0.50 | 0.48 | | 0.60 | 0.60 | | 0.90 | 0.65 | | 0.56 | 0.55 | | 2.00 | 0.98 | | 1.50 | 0.40 | | 0.73 | 0.04 | | 4.72 | 0.24 | | 0.20 | 0.056 | | 0.05 | 0.01 |
| Sodium N-lauroyl-triethanolamine-L-valinate | 0.010 | 0.009 | | 0.03 | 0.01 | | 0.55 | 0.5 | | 0.85 | 0.50 | | 0.80 | 0.65 | | 0.55 | 0.50 | | 1.00 | 0.80 | | 1.05 | 0.20 | | 0.85 | 0.35 | | 2.1 | 0.30 | | 0.20 | 0.06 | | 0.05 | 0.01 |
| N-coconut oil fatty acid acylglycinate | 0.009 | 0.010 | | 0.04 | 0.04 | | 0.13 | 0.07 | | 2.5 | 0.85 | | 0.95 | 0.74 | | 0.83 | 0.12 | | 0.75 | 0.85 | | 1.20 | 0.60 | | 0.70 | 0.04 | | 1.75 | 0.32 | | 0.18 | 0.120 | | 0.7 | 0.5 |
| Sodium N-lauroyl sarosinate | 0.20 | 0.120 | | 0.40 | 0.70 | | 3.10 | 1.00 | | 7.20 | 1.57 | | 1.54 | 1.25 | | 0.65 | 0.85 | | 7.07 | 0.92 | | 19.0 | 0.85 | | 1.40 | 0.20 | | 37.2 | 8.05 | | 8.90 | 1.32 | | 2.0 | 1.2 |
| Sodium Nα-lauroyl-L-lysinate | 0.008 | 0.019 | | 0.02 | 0.01 | | 0.40 | 0.32 | | 5.02 | 0.70 | | 0.70 | 0.50 | | 0.20 | 0.44 | | 3.08 | 0.85 | | 3.55 | 0.72 | | 1.25 | 0.04 | | 5.73 | 0.12 | | 1.41 | 0.210 | | 1.2 | 0.5 |
| Sodium Nα, Nω-dilauroyl-L-lysinate | 0.052 | 0.009 | | 0.05 | 0.05 | | 0.72 | 0.70 | | 1.20 | 0.85 | | 0.72 | 0.70 | | 0.25 | 0.31 | | 3.00 | 0.43 | | 1.00 | 0.25 | | 0.45 | 0.50 | | 0.62 | 0.07 | | 0.30 | 0.010 | | 0.9 | 0.1 |
| Control: | | | | | | | | | | | | | | | | | | | | | | | | | | | | | | | | | | | |
| Sodium lauryl sulfate | 98.2 | 19.5 | | 99.0 | 20.0 | | 99.5 | 19.2 | | 99.5 | 20.0 | | 98.8 | 20.0 | | 99.4 | 20.0 | | 95.0 | 18.2 | | 96.4 | 19.4 | | 98.5 | 19.3 | | 93.5 | 18.9 | | 85.5 | 13.5 | | 99.0 | 2.00 |
| Sodium dodecyl benzene sulfonate | 99.1 | 19.8 | | 99.9 | 20.0 | | 99.8 | 19.8 | | 99.0 | 19.3 | | 98.2 | 19.7 | | 98.2 | 19.2 | | 98.0 | 19.5 | | 97.8 | 19.3 | | 95.2 | 19.9 | | 95.7 | 19.2 | | 92.8 | 11.0 | | 99.0 | 19.8 |
| Fatty acid soap material | 78.5 | 13.2 | | 68.4 | 12.0 | | 52.7 | 8.7 | | 72.7 | 12.3 | | 68.7 | 10.4 | | 63.5 | 9.8 | | 32.6 | 4.3 | | 49.1 | 7.6 | | 37.5 | 6.7 | | 73.3 | 14.20 | | 40.3 | 58.0 | | 50.5 | 8.5 |

TABLE 3

| Capturing agents | Metal ions | | | | | | | |
|---|---|---|---|---|---|---|---|---|
| | $Hg^{2+}$ | $Al^{3+}$ | $Sn^{4+}$ | $Pb^{4+}$ | $Fe^{3+}$ | $Co^{3+}$ | $Ni^{3+}$ | $U^{3+}$ |
| The present invention: | | | | | | | | |
| Disodium N-hydrogenated tallow oil fatty acid acyl-L-glutamate | 0.005 | 0.010 | 0.009 | 0.006 | 0.010 | 0.012 | 0.010 | [1] 0.055 |
| | 0.010 | 0.012 | 0.025 | 0.021 | 0.705 | 0.630 | 0.500 | [2] 0.300 |
| Disodium N-oletyl-L-glutamate | 0.010 | 0.005 | 0.007 | 0.005 | 0.008 | 0.010 | 0.015 | 0.030 |
| | 0.020 | 0.018 | 0.023 | 0.014 | 0.170 | 0.150 | 0.230 | 0.200 |
| Sodium N-lauroyl-L-phenylalaninate | 0.002 | 0.007 | 0.002 | 0.004 | 0.009 | 0.008 | 0.005 | 0.010 |
| | 0.006 | 0.030 | 0.005 | 0.017 | 0.500 | 0.500 | 0.250 | 0.120 |
| Potassium N-lauroyl-DL-methionate | 0.008 | 0.015 | 0.010 | 0.005 | 0.030 | 0.035 | 0.020 | 0.010 |
| | 0.015 | 0.015 | 0.036 | 0.030 | 0.099 | 0.150 | 0.120 | 0.070 |
| Sodium N-lauroyl-L-valinate | 0.005 | 0.010 | 0.019 | 0.020 | 0.120 | 0.030 | 0.052 | 0.015 |
| | 0.012 | 0.085 | 0.025 | 0.029 | 0.860 | 0.750 | 0.820 | 0.080 |
| Triethanolamine N-coconut oil fatty acid acyl glycinate | 0.004 | 0.012 | 0.012 | 0.021 | 0.070 | 0.035 | 0.090 | 0.020 |
| | 0.005 | 0.008 | 0.040 | 0.088 | 0.500 | 0.500 | 0.650 | 0.100 |
| Sodium N-lauroyl sarcosinate | 0.010 | 0.017 | 0.020 | 0.010 | 0.130 | 0.250 | 0.085 | 2.90 |
| | 0.105 | 0.750 | 0.052 | 0.035 | 1.200 | 1.000 | 0.950 | 20.5 |
| Sodium N$\alpha$-lauroyl-L-lysinate | 0.002 | 0.005 | 0.010 | 0.010 | 0.055 | 0.075 | 0.050 | 0.10 |
| | 0.007 | 0.030 | 0.050 | 0.038 | 0.910 | 0.850 | 0.050 | 1.50 |
| Sodium N$\alpha$, N$\omega$-dilauroyl-L-lysinate | 0.012 | 0.002 | 0.001 | 0.002 | 0.002 | 0.010 | 0.030 | 0.020 |
| | 0.010 | 0.004 | 0.008 | 0.005 | 0.019 | 0.050 | 0.200 | 0.100 |
| Control: | | | | | | | | |
| Sodium lauryl sulfate | 32.7 | 27.3 | 11.6 | 50.0 | 31.6 | 25.5 | 27.5 | 20.5 |
| | 49.9 | 56.4 | 59.8 | 69.1 | 70.5 | 59.5 | 43.5 | 25.8 |
| Sodium dodecyl benzene sulfonate | 39.7 | 32.4 | 27.4 | 21.2 | 31.2 | 35.0 | 32.0 | 15.7 |
| | 50.1 | 59.2 | 51.3 | 39.5 | 70.0 | 65.5 | 50.0 | 30.5 |
| Fatty acid soap material | 10.3 | 9.08 | 27.5 | 42.5 | 1.00 | 2.10 | 1.30 | 50.7 |
| | 9.2 | 13.7 | 48.3 | 61.7 | 3.05 | 12.5 | 10.7 | 25.7 |

[1] Upper step: treated with activated charcoal.
[2] Lower step: passed through a sand bed.

NOTE.—The concentration of metal ions in the original solution: 100 p.p.m.

EXAMPLE 4

1.0 ml of 2 percent aqueous solution of disodium N-hydrogenated tallow oil fatty acid acyl-L-glutamate was added dropwise to an aqueous solution containing 100 ppm of hexaminecohalt (III) ions as a complex ion. The precipitated solid was filtered off and the residual complex ion concentration in the mother solution was measured with an atomic adsorption photometer. The result was 0.48 ppm. Thus, N-higher aliphatic acyl amino acid salt has satisfactory capturing activity to complex ions.

EXAMPLE 5

Various amounts of 2.0 percent aqueous solution of disodium N-hydrogenated tallow oil fatty acid acyl-L-glutamate were added dropwise to an aqueous solution of cadmium sulfate containing 100 ppm of cadmium ions with stirring. The precipitated solid was filtered off and the amounts of residual cadmium ion in the filtrates were measured with an atomic adsorption photometer. The FIGURE shows the relationship between the amount added of disodium N-hydrogenated tallow oil fatty acid acyl-L-glutamate and the rate of cadmium ion captured. It will be seen from the FIGURE that this capturing agent has good capturing action to cadmium ions at wide ranges of the amount added, and its capturing power is not affected even when it is added in excess amount of more than 6 equivalents.

EXAMPLE 6

To an aqueous solution of pH 11 containing 100 ppm of cadmium ions, was added a solution of 1.0 equivalent of N-stearoyl-DL-glutamic acid in ethanol. The formed insoluble precipitate was filtered off. The residual cadmium ion concentration in the mother solution was measured with an atomic adsorption photometer. The result was 0.007 ppm. Also, the mother solution was approximately neutral.

EXAMPLE 7

To a 90 percent methanol solution containing 100 ppm of cupric chloride, was added 1.5 equivalent of monosodium N-coconut oil fatty acid acyl-L-glutamate as 90 percent methanol solution. The formed precipitate was filtered off. The result of the measurement of the residual cupper ions in the mother solution by an atomic adsorption method was less than 0.01 ppm.

EXAMPLE 8

Two aqueous solutions of cadmium sulfate of 100 ppm and 20 ppm with respect to cadmium ion concentration were prepared. To the solutions were added 1.2 equivalent of disodium N-hydrogenated tallow oil fatty acid acyl-L-glutamate in the form of 2.0 percent aqueous solution and polyethylene glycol having the molecular weight of 400 in the ration of 0.01 g per liter of the original solution. The stirring was continued at room temperature, whereupon a large amount of hardly soluble cadmium salt precipitated immediately. The sedimentation velocity of the cadmium salt formed was measured by the method described below. Also, after the precipitate was filtered off with a filter paper ("Toyo filter paper No.5A"), the residual cadmium ion concentration in the filtrate was measured by using an atomic adsorption photometer. The results are shown in Table 4.

For the purpose of comparison, a similar test was carried out in the absence of polyethylene glycol and the result is also shown in the same table.

TABLE 4

| Capturing agent | Capturing assistant | $Cd^{++}$ conc. in the original solution (p.p.m.) | $Cd^{++}$ conc. in the filtrate (p.p.m.) | Sedimentation velocity of the formed cadmium salt (m./hr.) |
|---|---|---|---|---|
| Disodium N-hydrogenated tallow oil fatty acid acyl-L-glutamate. | None | 100 | 0.012 | 0.60 |
| Do | do | 20 | 0.005 | 0.45 |
| Do | Polyethylene. Glycol | 100 | 0.005 | 2.85 |
| Do | Glycol | 20 | 0.002 | 1.70 |

Note: Th sedimentation velociy: a certain amount of the sample (slurry) was gathered in a test tube of 5.0 cm in diameter and 50 cm in height and the test tube was stoppered and then inverted 10 times. The sedimentation velocity of the insoluble salt was then measured.

As is apparent from Table 4, the addition of polyethylene glycol brings effects to promote the sedimentation velocity and to increase the capturing effect.

EXAMPLE 9

There were prepared aqueous solutions of 100 ppm concentration respectively with respect to three kinds of metal ions shown in Table 5. In one case, to each solution was added 1.2 equivalent of each of several kinds of N-higher aliphatic acyl amino acid salts shown in Table 5 as a 2.0 percent aqueous solution. In another case, polyethylene glycol having the molecular weight of 400 was further added thereto in the ratio of 0.02 g per liter of the solution. In both cases, the stirring was continued at room temperature whereupon a large amount of the hardly soluble metal salt precipitated. The sedimentation velocities of the floc formed and the amounts of the residual metal ion concentration in the motor solution after filtration were measured as in Example 8. The results are summarized in Table 5, which also shows the results obtained when the similar procedure was conducted with sodium dodecyl benzene sulfonate or fatty acid soap in place of N-higher aliphatic acyl amino acid salt.

Note:
The value in the upper step of each item: no polyethylene glycol was added.
The value in the lower step of each item : polyethylene glycol was added.

EXAMPLE 10

To an aqueous solution of cupric sulfate, the concentration of which was 100 ppm, were added 1.2 equivalent of disodium N-hydrogenated tallow oil fatty acid acyl-L-glutamate as 2.0 percent aqueous solution and various kinds of flocculant assistants. The stirring was continued at room temperature, whereupon a large amount of the hardly soluble copper salt precipitated immediately. The sedimentation velocity of the salt precipitated and the residual copper ion concentration in the mother solution after the filtration were measured as in Example 8 to evaluate the capturing activities. The results were as shown in Table 6.

As is apparent from Table 6, four kinds of compounds, namely compounds having more than two hydroxyl radicals or ether linkages in the molecule, alkali metal salts of silicic acid and alkali metal salts of boric acid promote the aggregation and the velocity of the sedimentation.

TABLE 5

| | Metal ion | | | | | |
|---|---|---|---|---|---|---|
| | $Cd^{++}$ (as $CdSO_4$) | | $Cu^{2+}$ (as $CuSO_4$) | | $Pb^{2+}$ (as $Pb(NO_3)_2$) | |
| | Item to be measured | | | | | |
| Capturing agent | Residual $Cd^{++}$ conc. in the mother solution (p.p.m.) | Sedimentation velocity (m./hr.) | Residual $Cu^{2+}$ conc. in the mother solution (p.p.m.) | Sedimentation velocity (m./hr.) | Residual $Pb^{2+}$ conc. in the mother solution (p.p.m.) | Sedimentation velocity (m./hr.) |
| Disodium N-coconut oil fatty acid acyl-L-glutamate | 0.020 | 0.80 | 0.50 | 0.70 | 0.80 | 0.94 |
| | 0.007 | 2.55 | 0.10 | 2.05 | 0.04 | 1.78 |
| Potassium N-lauroyl-DL-ornithine | 0.021 | 0.60 | 0.26 | 0.40 | 1.50 | 0.50 |
| | 0.010 | 1.70 | 0.05 | 2.00 | 0.07 | 2.40 |
| Sodium N-hydrogenated tallow oil fatty acid acyl-L-phenylalaninate. | 0.004 | 1.30 | 0.25 | 1.43 | 1.50 | 1.30 |
| | 0.002 | 4.00 | 0.02 | 4.00 | 0.30 | 7.50 |
| Sodium dodecyl benzene sulfonate | 99.1 | 0.0 | 92.8 | 0.0 | 98.2 | 0.0 |
| | 99.0 | 0.0 | 93.5 | 0.0 | 99.0 | 0.0 |
| Fatty acid soap material | 78.5 | 0.1 | 40.3 | 0.3 | 63.5 | 0.2 |
| | 81.7 | 0.0 | 48.0 | 0.4 | 64.0 | 0.2 |

TABLE 6

| Flocculant assistant | Residual $Cu^{2+}$ concentration, p.p.m. | Sedimentation velocity, m./hr. | Evaluation | Flocculant assistant | Residual $Cu^{2+}$ concentration, p.p.m. | Sedimentation velocity, m./hr. | Evaluation |
|---|---|---|---|---|---|---|---|
| None | 0.50 | 0.70 | | Gelatine | 0.50 | 0.70 | X |
| Calcium oxide | 0.60 | 0.45 | X | Water soluble starch | 0.40 | 1.30 | Δ |
| Calcium hydroxide | 1.30 | 0.30 | X | Albumin | 0.50 | 0.70 | X |
| Sodium carbonate | 1.30 | 0.20 | X | Sodium laurate | 0.75 | 0.50 | X |
| Sodium hydroxide | 1.00 | 0.20 | X | Sodium stearate | 1.00 | 0.45 | X |
| Aluminum sulfate | 2.50 | 0.10 | X | Polyvinyl alcohol (M.W. 500) | 0.15 | 2.75 | O |
| Ferrous sulfate | 2.75 | 0.40 | X | Casein | 0.40 | 1.50 | Δ |
| Ammonium bicarbonate | 0.50 | 0.70 | X | Cellulose powder | 0.20 | 1.80 | O |
| Thiourea | 0.50 | 0.50 | X | Ethylene glycol | 0.10 | 1.50 | O |
| Urea | 0.50 | 0.70 | X | Glycerin | 0.30 | 1.50 | Δ |
| Ammonium formate | 0.50 | 0.50 | X | Polyethylene glycol (M.W. 400) | 0.10 | 2.05 | O |
| Sodium bicarbonate | 3.20 | 0.35 | X | Polyethylene glycol (M.W. 1500) | 0.05 | 3.85 | O |
| Disodium phosphate | 1.20 | 0.50 | X | Polyethylene glycol (M.W. 4000) | 0.02 | 4.00 | O |
| Sodium metaborate | 0.10 | 1.60 | O | Polyethylene glycol (M.W. 6000) | 0.30 | 2.00 | O |
| Sodium metasilicate | 0.05 | 1.95 | O | Xylose | 0.20 | 1.80 | O |
| Sodium orthosilicate | 0.20 | 1.25 | Δ | Fly ash | 0.50 | 0.70 | X |
| Polyacrylamide (partial hydrolyzate) | 0.50 | 0.70 | X | Bentonite | 0.50 | 0.70 | X |
| | 0.50 | 0.70 | X | Cement dust | 0.50 | 0.70 | X |
| Sodium polyacrylate | 0.70 | 0.40 | X | Maleic acid resin | 0.50 | 0.70 | X |
| Sodium polyglutamate | 0.90 | 0.30 | X | Water soluble urea resin | 0.50 | 0.70 | X |
| Polyvinyl acetate | 0.50 | 0.75 | X | Cationic polyurea | 0.50 | 0.70 | X |
| Polyvinyl pyridine | 0.50 | 0.70 | X | Polyaminotriazole | 0.50 | 0.70 | X |
| Polyvinyl pyrrolidone | 0.50 | 0.70 | X | Polyoxyethylene dodecyl ether | 0.40 | 1.00 | Δ |

Note.—Evaluation criteria:
X = does not promote the aggregation and the velocity of the sedimentation.
Δ = promotes appreciably the aggregation and the velocity of the sedimentation.
O = promotes remarkably the aggregation and the velocity of the sedimentation.

EXAMPLE 11

To 1 liter each of an aqueous solution containing 100 ppm of ferric ion, was added 1.2 equivalent of dipotassium N-stearoyl-DL-glutamate as 2.0 percent aqueous solution and 0.01 – 50 mg of polyethylene glycol having molecular weight of 400 to 6,000 or 0.01 – 50 mg of polyvinyl alcohol having molecular weight of 500 – 2,000. The stirring was continued at room temperature. After settling, the sdeimentation velocity of the floc formed and the residual ferric ion concentration in the mother solution after filtration were measured as in Example 8 to evaluate the ability of the flocculant assistants to promote the aggregation and the sedimentation velocity. The results are summarized in Table 7.

TABLE 7

| Flocculant assistants | Molecular weight | Amounts added (mg.) | | | | | | | |
|---|---|---|---|---|---|---|---|---|---|
| | | 0.01 | 0.05 | 0.10 | 0.50 | 1.0 | 5.0 | 10.0 | 50.0 |
| Polyethylene glycol | 400 | Δ | Δ | Δ | O | O | O | × | × |
| | 1,500 | Δ | O | O | O | O | × | × | × |
| | 4,000 | O | O | O | O | × | × | × | × |
| | 6,000 | Δ | Δ | Δ | Δ | × | × | × | × |
| Polyvinyl alcohol | 500 | Δ | Δ | Δ | Δ | O | O | O | × |
| | 1,400 | O | O | O | O | O | O | Δ | Δ |
| | 2,000 | O | O | O | Δ | Δ | Δ | Δ | Δ |

Note) Evaluation criteria

× : The $Fe^{3+}$ concentration in the mother solution 3.5 ppm, the sedimentation velocity 0.7 m/hr Δ : The $Fe^{3+}$ concentration 3.5 – 2.0 ppm The sedimentation velocity 0.7 – 1.5 m/hr O : The $Fe^{3+}$ concentration less than 2.0 ppm, The sedimentation velocity higher than 1.5 m/hr From these experimental results, it was recognized that the higher is the molecular weight of a high molecular series of flocculant assistants, the greater is the ability to promote the aggregation and the sedimentation velocity, while the addition of excess amounts of them did not show the appreciable capturing effect, and the excess assistants solubilized the metal salt formed.

EXAMPLE 12

To 1 liter each of an aqueous solution containing 100 ppm of ferric ions, were added 1.2 equivalent of sodium N-hydrogenated tallow oil fatty acid acyl-DL-methionine as 2.0 percent aqueous solution and capturing assistants shown in Table 8 singly or in admixture of two components. The sedimentation velocity of the formed floc and the residual ferric ion concentration in the mother solution after filtration were measured and the results are summarized in Table 8.

TABLE 8

| | Polyethylene glycol (400) | | Polyvinyl alcohol (500) | | Sodium methasilicate | | Soluble starch | | Polyacrylic amide | |
|---|---|---|---|---|---|---|---|---|---|---|
| | (A) | (B) | (A) | (B) | (A) | (B) | (A) | (B) | (A) | (B) |
| Polyethylene glycol (400) | 1.00 | 2.40 | | | | | | | | |
| Polyvinyl alcohol (500) | 1.40 | 2.85 | 1.50 | 1.90 | | | | | | |
| Sodium methasilicate | 0.12 | 3.80 | 0.30 | 2.75 | 0.75 | 0.50 | | | | |
| Soluble starch | 0.78 | 2.80 | 1.00 | 2.40 | 0.32 | 1.70 | 3.50 | 0.50 | | |
| Polyacrylic amide | 2.10 | 1.20 | 2.70 | 1.20 | 1.25 | 0.45 | 3.90 | 0.65 | 4.05 | 0.45 |

Note)

A. Each column shows the residual ferric ion concentration (unit : ppm) in the mother solution resulted by using a filter paper (Toyo filter paper No.5A).

B. Each column shows the sedimentation velocity (unit : m/hr) of the floc.

The residual ferric ion concentration in the mother solution when no capturing assistant was added was 4.05 ppm. The sedimentation velocity of the floc formed when no capturing assistant was added was 0.45 m/hr. The amount added of the respective capturing assistants was 5.0 mg.

It will be seen from Table 8 that the use of the mixture of capturing assistants gives better result as compared with the use of single capturing assistant.

What we claim is:

1. A method of removing cations of a metal of Group Ib or of Groups II to VIII of the Periodic Table of the Elements from their solution in an aqueous medium which comprises:
   a. dissolving in said medium an amount of an N-acylamino acid or of a water soluble salt of said acid sufficient for substantially completely precipitating said cations,
      1. the pH of said medium being at least 4,
      2. the acyl radical of said N-acylamino acid being alkanoyl or alkenoyl having 7 to 25 carbon atom,
      3. the acylamino group of said N-acylamino acid being connected with a carboxyl group of said N-acylamino acid by divalent alkylene having one to five carbon atoms; and
   b. separating the precipitated cations from said medium.

2. A method as set forth in claim 1, wherein said amount is 0.01 to 10 stoichiometric equivalents of said cations.

3. A method as set forth in claim 1, wherein said amount is 1.0 to 4.0 stoichiometric equivalents of said cations.

4. A method as set forth in claim 3, wherein said alkanoyl or alkenoyl has 11 to 21 carbon atoms.

5. A method as set forth in claim 1, wherein an amount of at least one capturing assistant effective for enhancing the settling velocity of the precipitated cations in said medium and for reducing the concentration of residual cations in said medium after said precipitating is dispersed in said medium, said capturing assistant being an organic compound having two or more alcoholic hydroxyl groups, an organic compound having a polyoxyethylene radical including more than two ether linkages, an alkali metal silicate, or an alkali metal borate.

6. A method as set forth in claim 5, wherein the amount of said capturing assistant is between $10^{-7}$ and 10 percent of the weight of said N-acylamino acid.

7. A method as set forth in claim 6, wherein the amount of said capturing assistant is between $10^{-5}$ and $10^{-1}$ percent of said weight.

8. A method as set forth in claim 6, wherein said capturing assistant is a polyhydric alcohol.

9. A method as set forth in claim 6, wherein said capturing assistant is a saccharide.

10. A method as set forth in claim 6, wherein said capturing assistant is a polyalkylene glycol.

11. A method as set forth in claim 6, wherein said capturing assistant is an alkali metal silicate or alkali metal borate.

12. A method as set forth in claim 1, wherein the pH of said medium is lower than 8 after said dissolving.

* * * * *

UNITED STATES PATENT OFFICE
CERTIFICATE OF CORRECTION

Patent No. 3,755,158        Dated August 28, 1973

Inventor(s) SHINICHI INAZUKA ET AL

It is certified that error appears in the above-identified patent and that said Letters Patent are hereby corrected as shown below:

In the heading, line /30/, after "Aug. 10, 1970 Japan .... 45/69916" insert --

Oct. 26, 1970 Japan .......... 45/94078 --

Signed and sealed this 20th day of November 1973.

SEAL)
ttest:

DWARD M. FLETCHER, JR.
ttesting Officer

RENE D. TEGTMEYER
Acting Commissioner of Patents